United States Patent
Weisgerber et al.

(10) Patent No.: US 6,793,227 B1
(45) Date of Patent: Sep. 21, 2004

(54) DIFFERENTIAL STABILIZER ARM FOR MOTOR VEHICLE SUSPENSION

(76) Inventors: Matthew Weisgerber, 710 W. Main, Frazee, MN (US) 56544; Kari Riggle, 710 W. Main, Frazee, MN (US) 56544

( * ) Notice: Subject to any disclaimer, the term of this patent is extended or adjusted under 35 U.S.C. 154(b) by 99 days.

(21) Appl. No.: 10/255,928

(22) Filed: Sep. 26, 2002

(51) Int. Cl.$^7$ ................................................ B60G 9/02
(52) U.S. Cl. ......................... 280/124.119; 280/124.156
(58) Field of Search ..................... 280/124.119, 124.13, 280/124.135, 124.137, 124.149, 124.152, 124.153, 124.156

(56) References Cited

U.S. PATENT DOCUMENTS

| | | | |
|---|---|---|---|
| 3,592,485 A | * 7/1971 | Buhl | ........................ 280/6.159 |
| 4,445,707 A | 5/1984 | Raidel | |
| 4,465,298 A | 8/1984 | Raidel, Sr. | |
| 4,494,771 A | 1/1985 | Raidel | |
| 4,541,653 A | * 9/1985 | Raidel | ................. 280/124.109 |
| 4,693,491 A | * 9/1987 | Akatsu et al. | ........ 280/124.108 |
| 4,982,978 A | 1/1991 | Kawasaki | |
| 4,989,894 A | 2/1991 | Winsor et al. | |
| 5,560,638 A | 10/1996 | Lee | |
| 5,649,719 A | * 7/1997 | Wallace et al. | ........ 280/124.156 |
| 5,785,345 A | 7/1998 | Barlas et al. | |
| 6,042,131 A | * 3/2000 | Bailey | ...................... 280/86.75 |
| 6,109,630 A | 8/2000 | Dazy et al. | |
| 6,135,470 A | 10/2000 | Dudding | |
| 6,152,468 A | 11/2000 | Gläser et al. | |
| 6,193,251 B1 | 2/2001 | Jung | |
| 6,267,526 B1 | * 7/2001 | McLaughlin | ................. 403/150 |
| 6,270,282 B1 | * 8/2001 | McLaughlin | ................. 403/158 |
| 6,390,485 B1 | * 5/2002 | Cadden | ............... 280/124.163 |
| 6,439,588 B1 | * 8/2002 | Svensson | ............. 280/124.116 |
| 6,543,797 B2 | * 4/2003 | Van Schmus et al. | 280/124.104 |

* cited by examiner

*Primary Examiner*—Paul N. Dickson
*Assistant Examiner*—Toan To
(74) *Attorney, Agent, or Firm*—John D. Gugliotta; Olen L. York, III

(57) ABSTRACT

A differential stabilizer arm is provided to reduce rear wheel hop on motor vehicles. A universal joint is securely fastened to the frame or cross member of the vehicle approximately three feet in front of the rear axle. Located atop the universal joint is a box-type saddle arrangement that is lined with polyethylene, also known as Hi-Fax®, to reduce the coefficient of friction. A square tube then slides in and out of this channel in a manner parallel to the centerline or drive shaft of the vehicle. At the opposite end of the square shaft is a V-shaped arm with isolated rubber brushings on the end of each of the two arms. One arm connects to the rear axle housing above the axle, and the other connects to the housing below the axle. In such a manner the invention will follow the axle as it moves through any of the three axes of movement.

9 Claims, 4 Drawing Sheets

DIFFERENTIAL STABILIZER ARM FOR MOTOR VEHICLE SUSPENSION

RELATED APPLICATIONS

The present invention was first described in Disclosure Document Registration 494,543 filed on Jun. 1, 2001, 2002 under 35 U.S.C. §122 and 37 C.F.R. §1.14. There are no previously filed, nor currently any co-pending applications, anywhere in the world.

BACKGROUND OF THE INVENTION

1. Field of the Invention

The present invention relates generally to stabilization systems for motor vehicles, and more specifically to a differential stabilizer arm mounted to the carriage of a motor vehicle.

2. Description of the Related Art

The popularity of off-road and sport utility vehicles is at an all-time high. These vehicles, touted for their ruggedness, durability and ability to travel over a variety of terrains, possess features such as four-wheel drive, high-output engines and heavy-duty suspensions that will withstand the rigors of off-road travel. Especially popular for hunters and outdoors men, these vehicles allow them to reach camping and hunting sites that would otherwise be inaccessible. However, these vehicles exhibit traits which make them different from conventional automobiles. One is their increased ride height. Another is their susceptibility to display wheel hop, or the tendency for the wheels to jump up and down on the pavement under hard acceleration. This trait can also be seen on higher horsepower standard vehicles as well. This wheel hop not only results in loss of acceleration and decreased performance, it also may result in damaged suspension components such as universal joints, springs, shock absorbers and the like. Accordingly, there exists a need for a means by which wheel hop can be reduced on motor vehicles in a manner which does not affect the handling characteristics of the vehicle.

A search of the prior art did not disclose any patents that read directly on the claims of the instant invention; however, the following references were considered related:

U.S. Pat. No. 6,193,251, issued in the name of Jung, describes an automotive suspension system;

U.S. Pat. No. 6,152,468, issued in the name of Gläser et al., describes a composite suspension control arm shaft for motor vehicles;

U.S. Pat. No. 6,135,470, issued in the name of Dudding, describes a transverse stabilizer for a wheel axle suspension system;

U.S. Pat. No. 6,109,630, issued in the name of Dazy et al., describes a rear suspension control arm;

U.S. Pat. No. 5,785,345, issued in the name of Barlas et al., describes a means for and method of controlling frame rise in vehicle suspensions;

U.S. Pat. No. 5,560,638, issued in the name of Lee, describes a rear suspension system for a vehicle;

U.S. Pat. No. 4,989,894, issued in the name of Winsor et al., describes an independent rear suspension for a vehicle;

U.S. Pat. No. 4,982,978, issued in the name of Kawasaki, describes a rear suspension system for a vehicle;

U.S. Pat. No. 4,494,771, issued in the name of Raidel, describes a suspension system having a U-joint mount and lateral guide for air spring suspension;

U.S. Pat. No. 4,465,298, issued in the name of Raidel, Sr., describes a suspension system having a U-joint mount and lateral guide for air spring suspension; and U.S. Pat. No. 4,445,707, issued in the name of Raidel, describes a suspension system having a parallelogram axle stabilization and central elastomer spring.

Consequently, there exists a need for new product ideas and enhancements for existing products in the automobile industry directed at stabilizing the differential force exerted on the rear axle during operation.

SUMMARY OF THE INVENTION

It is therefore an object of the present invention to provide a differential stabilization arm mounted to the carriage of an automobile to provide dependable stabilization of the rear wheels during operation.

It is a feature of the present invention to provide a differential stabilization arm having a mounting assembly that provides range of motion in three axes, thereby absorbing the torque force exerted on the differential of the vehicle.

It is a further feature of the present invention to provide a differential stabilization arm having a pair of slide assist blocks capable of reducing the coefficient of friction between the mounting assembly and the connecting arm, thereby allowing reciprocating motion between the mounting assembly and connecting arm as dictated by the operation of the vehicle and the terrain of the grade.

Briefly described according to one embodiment of the present invention, the differential stabilizer arm is an apparatus that is intended to reduce rear wheel hop on motor vehicles. The invention consists of a universal joint, of which one end is securely fastened to the frame or cross member of the vehicle approximately three feet in front of the rear axle. Located atop the universal joint is a box-type saddle arrangement that is lined with polyethylene, also known as Hi-Fax®, to reduce the coefficient of friction. A square tube then slides in and out of this channel in a manner parallel to the centerline or drive shaft of the vehicle. At the opposite end of the square shaft is a V-shaped arm with isolated rubber bushings on the end of each of the two arms. One arm connects to the rear axle housing above the axle, and the other connects to the housing below the axle. In such a manner the invention will follow the axle as it moves through any of the three axes of movement. However, as soon as high torque is applied to the axle, and it wants to twist around against leaf springs and other suspension components, it is prohibited from doing so by the invention. The use of the differential stabilizer arm provides additional protection against wheel hop, excessive torque, and other problems in a manner that not only extends the life of other suspension components, but makes driving more safe, controlled and fun.

The use of the present invention provides users with all of the materials and tools necessary to ensure that a user may easily use and maintain a stackable support pad for the wrists and arms of a computer operator.

An advantage of the present invention is that it is specifically adapted for use in an automobile for use on highway or rugged terrain.

A further advantage of the present invention is that it is specifically adapted for easy installation by a lay mechanic with little or no experience.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
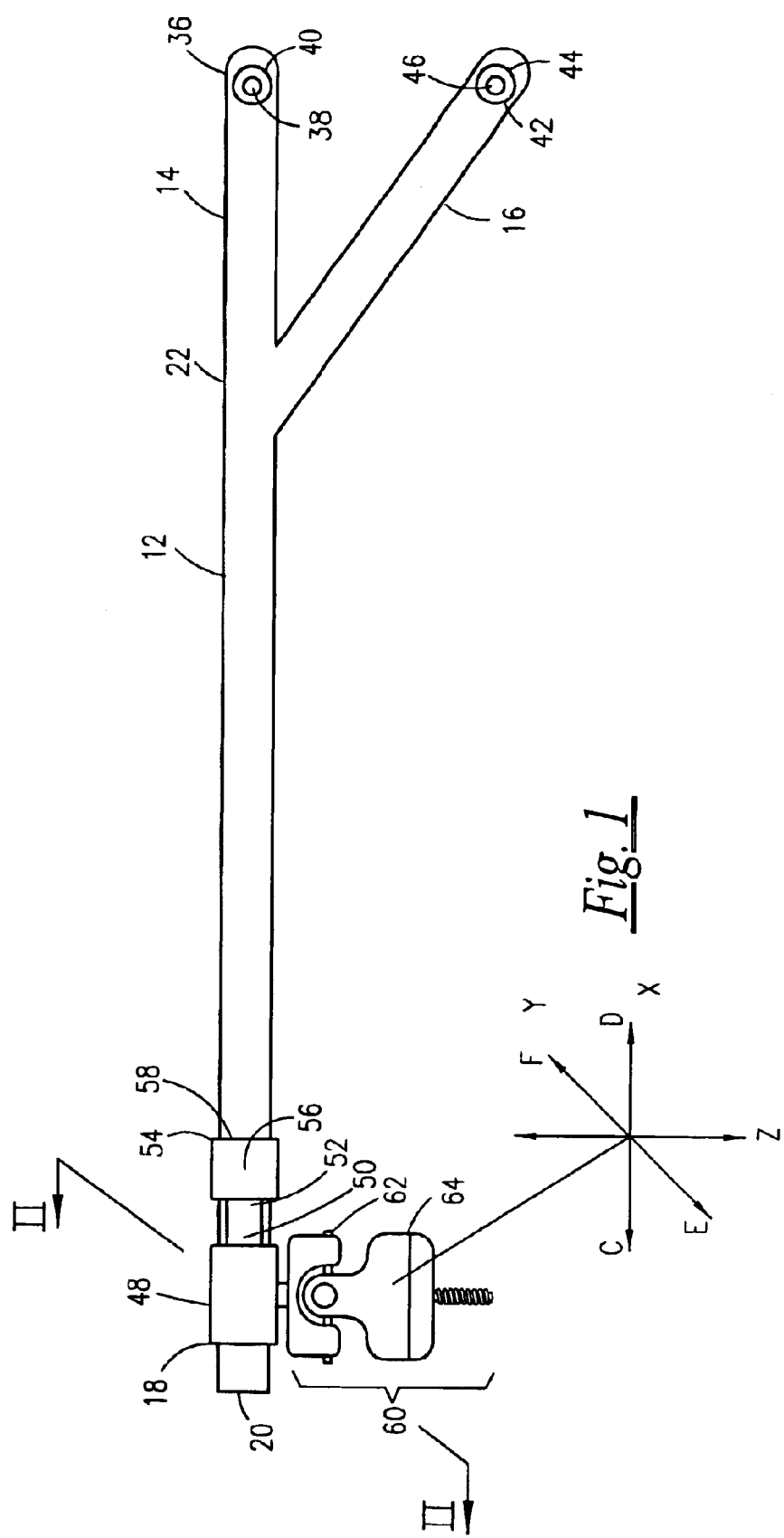
FIG. 1 is a side view of a differential stabilization arm.

Referring now to FIG. 1, a differential stabilization arm 10 is shown in accordance with the preferred embodiment of the present invention. The differential stabilization arm 10 includes a "Y" shaped connecting arm 12 having a linearly elongated upper arm 14 and a linearly elongated lower arm 16 affixed to the upper arm 14. A mounting assembly 18 is affixed at an end 20 of the connecting arm 12. The connecting arm 12 is affixed to a skid frame 24 of a rear wheel drive vehicle by a threaded stud 22 projecting from a universal joint 26 and secured by a nut 22a. The connecting arm 12 is also affixed to a differential arm of a rear wheel drive vehicle by alignment of the upper arm 14 to an upper mounting bracket 28 and secured by a first threaded bolt 30a and nut 30b, and by alignment of the lower arm 16 to a lower mounting bracket 32 and secured by a second threaded bolt 34a and nut 34b.

The upper arm 14 includes an upper mount 36. The upper mount 36 is an annular opening having an annular rubber bushing 38 housing a metal bushing 40. The rubber bushing 38 provides a means for absorbing some of the energy exerted on the upper mount 36 during operation of the vehicle, while also providing flexibility for some motion of the upper mount 36. The metal bushing 40 provides rigid support to the upper mount 36 and in combination with the rubber bushing 38 absorbs the energy exerted on the upper mount 36 during operation of the vehicle. Likewise, the lower arm 16 includes a lower mount 42. The lower mount 42 is an annular opening having an annular rubber bushing 44 housing a metal bushing 46 which operates in the same manner as the rubber and metal bushings 38 and 40 of the upper arm 14 and upper mount 36.

The mounting assembly 18 has an "I" shaped exterior (as illustrated by FIG. 1) and includes a retaining collar 48 affixed to a front end 50 of an extension arm 52, and an alignment arm 54 affixed to a back end 56 of the extension arm 52. The retaining collar 48, the extension arm 52 and the alignment arm 54 have a general rectangular perimeter adapted and form an internal cavity 58 for receiving the end 20 of the connecting arm 12 and permits the sliding of the connecting arm 12 in a reciprocating manner (as indicated by directional arrows "A–B" and depicting motion along an Z-axis).

The mounting assembly 14 further includes a universal joint 60 having a stationary socket member 62 that is permanently affixed to the retaining collar 48 along one side while also housing a pivoting member 64 along the opposite side. The pivoting member 64 allows the connecting arm 12 to move along two axes (as indicated by directional arrows "C–D", depicting motion along an X-axis, and directional arrows "E–F", depicting motion along a Y-axis, respectively). A threaded stud 22 projects from the pivoting member 64 and permits the mounting of the differential stabilizer arm 10 to a skid frame 24 of a vehicle and is secured by a nut 22a. It is envisioned that a Loctite™ compound, or other similar compound, will be used on the threaded connection to provide protection against corrosion and allow for ease of separation of the nut 22a from the threaded stud 22 at a later time if necessary.

Figure 2:
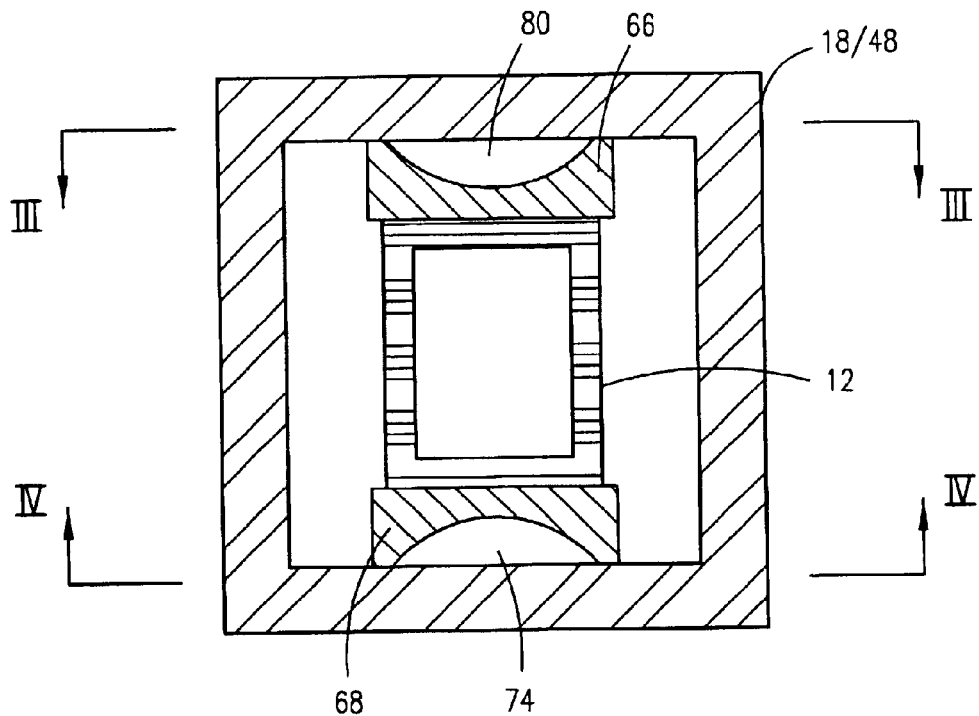
FIG. 2 is a cross-sectional view of the apparatus of FIG. 1, taken through line II-II, and illustrating the arrangement of the connecting arm as housed with the mounting assembly and the reduction of friction by the upper and lower slide assist blocks.
Figure 3:
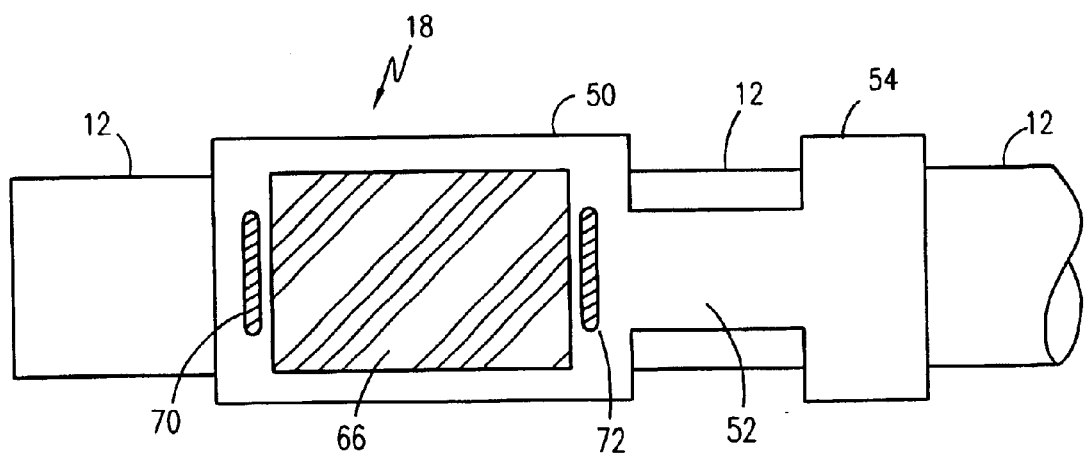
FIG. 3 is a top cross-sectional view of the apparatus of FIG. 2, taken through line III-III, and illustrating the upper slide assist block and the retainers used to prevent excessive reciprocating motion by the upper slide assist block.
Figure 4:
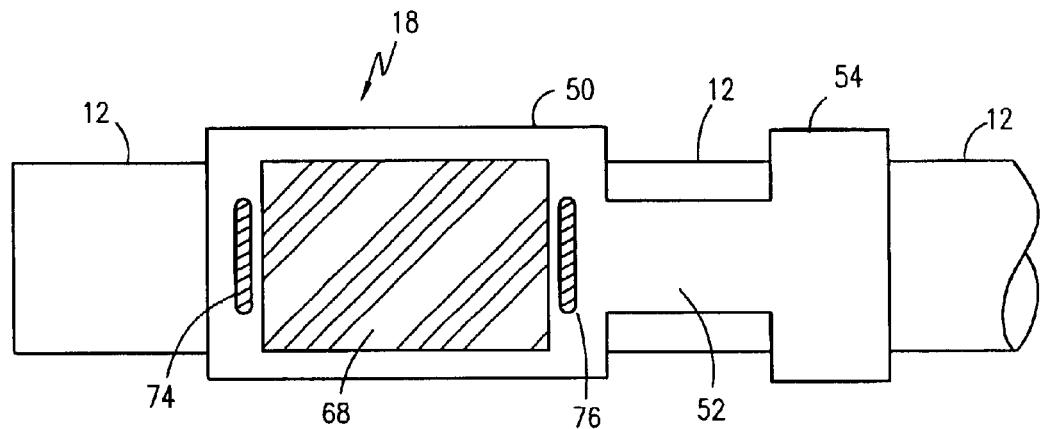
FIG. 4 is a bottom cross-sectional view of the apparatus of FIG. 2, taken through line IV-IV, and illustrating the lower slide assist block and the retainers used to prevent excessive reciprocating motion by the lower slide assist block.

Referring now to FIG. 2, FIG. 3 and FIG. 4, cross-sectional views of the mounting assembly 18 and the retaining collar 48 are shown in which the connecting arm 12 is slidably inserted into the retaining collar 48. An upper slide assist block 66 and a lower slide assist block 68 are affixed along the internal perimeter of the retaining collar 48 and are manufactured from a material so as to provide a means for reducing the friction generated between the contact of the connecting arm 12 and the retaining collar 48. It is envisioned that the upper and lower slide assist blocks 66 and 68 will be manufactured from a material such as polyethylene, commonly known as Hi-Fax®, because of the extended life span and resistance to wear that polyethylene exhibits. A plurality of retainers 70, 72, 74 and 76 are mounted to the internal perimeter of the retaining collar 48 as well. The retainers 70, 72, 74 and 76 are mounted so as to mechanically impinge the upper and lower slide assist blocks 66 and 68, wherein a pair of retainers 70 and 72 are mounted to the front and back, respectively, of the upper slide assist block 66, and a pair of retainers 74 and 76 are mounted to the front and back, respectively, of the lower slide assist block 68. Thus, the retainers 70, 72, 74 and 76 prevent the upper and lower slide assist blocks 66 and 68 from sliding in a reciprocating motion.

Figure 5:
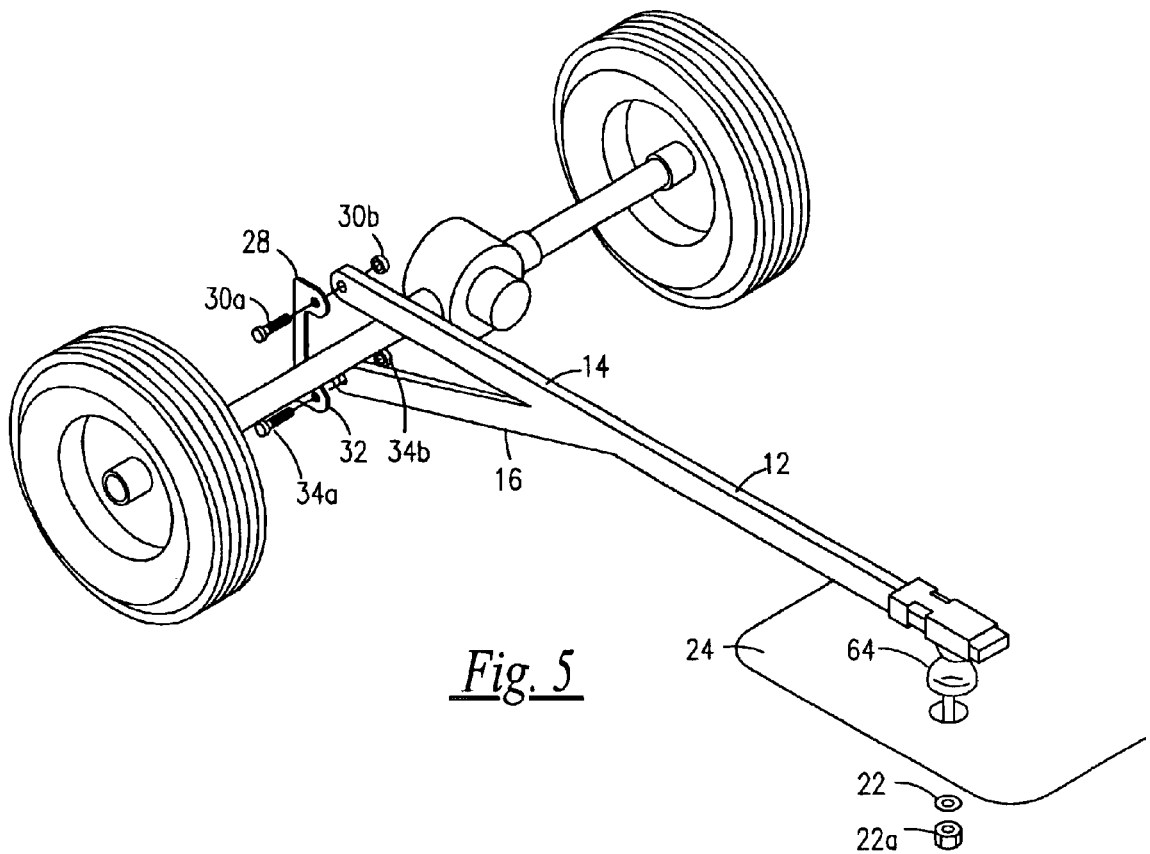
FIG. 5 is a perspective view of a differential stabilization arm partially affixed to the skid frame and differential of a vehicle.
Figure 6:
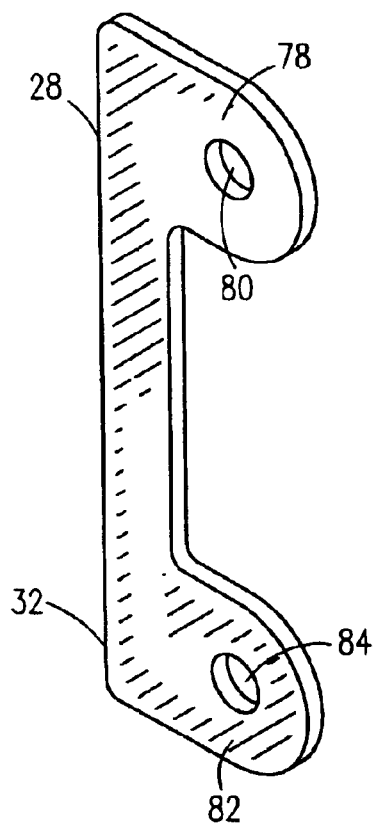
FIG. 6 is a perspective view of the upper and lower mounting bracket, showing the apertures used for threading bolts through and connecting with the upper and lower arms of the differential stabilization arm.
Figure 7:
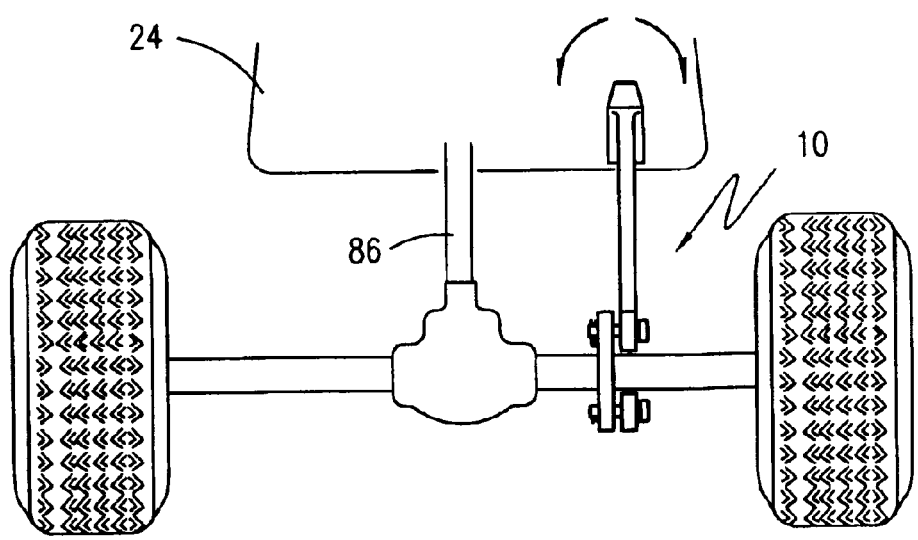
FIG. 7 is a perspective view from the rear of a vehicle illustrating the installation arrangement of the differential stabilization arm in relation to the drive train, in which the differential stabilization arm lies parallel or approximately parallel and adjacent to the drive train.

Referring now to FIG. 5, FIG. 6 and FIG. 7, the upper mounting bracket 28 and the lower mounting bracket 32 are affixed to the differential of the rear wheel axle, preferably by weld mounting or other suitable means for providing a rigid connection between the brackets 28 and 32 to the differential. The upper mounting bracket 28 and the lower mounting bracket 32 have a circular disc 78 and 82 and an aperture 80 and 84 through which the first or second threaded bolts 30a or 34a are inserted, passing through the upper or lower mounts 36 or 42 of the upper and lower arms 14 and 16, and are then secured by nuts 30b or 34b. This arrangement securely fastens the upper and lower arms 14 and 16 to the differential of the rear wheel axle.

Referring specifically to FIG. 5 and FIG. 7, the differential stabilization arm 10 is shown in an installed state lying parallel or approximately parallel to the drive train 86 of the vehicle. Installation of the differential stabilization arm 10 parallel or approximately parallel, versus installation near the perimeter of the body, for instance, most effectively arrests the torque motion exerted on the differential during vehicle operation. Installation of the differential stabilization arm 10 away from the drive train 86 would only provide the same anti-torque characteristics provide by leaf springs, shock absorbers and other frame and suspension components located along the perimeter of the vehicle. In addition, leaf springs, shock absorbers and other frame and suspension components do not provide any anti-leveraging characteristics and are subject to damage from the twisting forces and motion.

It is envisioned that other styles and configurations of the present invention can be easily incorporated into the teachings of the present invention, and only one particular configuration shall be shown and described for purposes of clarity and disclosure and not by way of limitation of the scope.

2. Operation of the Preferred Embodiment

The present invention is designed with ease of operation in mind, thereby allowing the differential stabilization arm 10 to be utilized by a lay (or do-it-yourself) mechanic in which little or no training or experience is required for installing and maintaining the differential stabilization arm 10.

The differential stabilization arm 10 is acquired as an incorporated component of a new vehicle or may be purchased as an after market add-on component. If purchased as an after market add-on component, a user will drill a sufficiently sized hole in the skid frame 24 of the vehicle. The user will then affix the upper and lower mounting brackets 28 and 32 to the differential of the rear wheel axle. The user will then install the differential stabilization arm 10 by first inserting the threaded stud 22 through the drilled hole in the skid frame 24 and secured by a nut 22a. Then, the user will align the upper arm 14 and upper mount 36 with the aperture 80 of the upper mounting bracket 28 and secure the upper arm 14 to the bracket 28 by a threaded bolt 30a and nut 30b. Likewise, the user will align the lower arm 16 and the lower mount 42 with the aperture 84 20. of the lower mounting bracket 32 and secure the lower arm 16 to the bracket 32 by a threaded bolt 34a and nut 34b.

The differential stabilization arm 10 will operate in a transparent manner, even if the operator of the vehicle is not aware of the device. During hard accelerations, the differential stabilization arm 10 will prevent the torque forces from twisting the differential (as noted by the directional arrows in FIG. 7), thereby avoiding the transmission of torque forces to other suspension components and preventing damage to said components. In addition, the restraining action by the differential stabilization arm 10 will wheel to road contact and avoid "wheel-hopping" or loss of traction often associated with off-road driving.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A differential stabilizer arm for motor vehicle suspension comprising:

a connecting arm having a linearly elongated upper arm and a linearly elongated lower arm affixed to the upper arm at an acute angle, wherein said connecting arm is affixed to a differential arm of a rear wheel drive vehicle by alignment of said upper arm to an upper mounting bracket and secured thereto, and by alignment of said lower arm to a lower mounting bracket and secured thereto, wherein lower arm includes a lower mount forming an annular opening having an annular rubber bushing housing a metal bushing for providing means for absorbing some of the energy exerted on the lower mount during operation of the vehicle, while also providing flexibility for some motion of the lower mount;

a mounting assembly affixed at an end of said connecting arm for affixing said connecting arm to a skid frame of a rear wheel drive vehicle;

a universal joint terminating said mounting assembly for providing pivoting interconnection between said connecting arm and said skid frame;

wherein said connecting arm is affixed to a differential arm of a rear wheel drive vehicle.

2. The differential stabilizer arm for motor vehicle suspension of claim 1, wherein said lower mounting bracket is affixed to the differential of the rear wheel axle for providing a rigid connection between the brackets to the differential.

3. A differential stabilizer arm for motor vehicle suspension comprising:

a connecting arm having a linearly elongated upper arm and a linearly elongated lower arm affixed to the upper arm at an acute angle, wherein said connecting arm is affixed to a differential arm of a rear wheel drive vehicle by alignment of said upper arm to an upper mounting bracket and secured thereto, and by alignment of said lower arm to a lower mounting bracket and secured thereto;

a mounting assembly affixed at an end of said connecting arm for affixing said connecting arm to a skid frame of a rear wheel drive vehicle;

a universal joint terminating said mounting assembly for providing pivoting interconnection between said connecting arm and said skid frame;

wherein said connecting arm is affixed to a differential arm of a rear wheel drive vehicle, wherein said mounting assembly has an "I" shaped exterior and further comprises:

a retaining collar affixed to a front end of an extension arm; and an alignment arm affixed to a back end of said extension arm.

4. The differential stabilizer arm for motor vehicle suspension of claim 3, wherein said retaining collar, said extension arm and said alignment arm each have a general rectangular perimeter adapted and form an internal cavity for receiving the end of said connecting arm and permitting the sliding of said connecting arm in a reciprocating manner.

5. A differential stabilizer arm for motor vehicle suspension comprising:
   a connecting arm having a linearly elongated upper arm and a linearly elongated lower arm affixed to the upper arm at an acute angle, wherein said connecting arm is affixed to a differential arm of a rear wheel drive vehicle by alignment of said upper arm to an upper mounting bracket and secured thereto, and by alignment of said lower arm to a lower mounting bracket and secured thereto, wherein said upper arm includes an upper mount forming an annular opening having an annular rubber bushing housing a metal bushing for providing means for absorbing some of the energy exerted on the upper mount during operation of the vehicle, while also providing flexibility for some motion of the upper mount;
   a mounting assembly affixed at an end of said connecting arm for affixing said connecting arm to a skid frame of a rear wheel drive vehicle;
   a universal joint terminating said mounting assembly for providing pivoting interconnection between said connecting arm and said skid frame;
wherein said connecting arm is affixed to a differential arm of a rear wheel drive vehicle.

6. The differential stabilizer arm for motor vehicle suspension of claim 5, wherein said upper mounting bracket is affixed to the differential of the rear wheel axle for providing a rigid connection between the brackets to the differential.

7. The differential stabilizer arm for motor vehicle suspension of claim 5, wherein said universal joint of said mounting assembly further comprises a stationary socket member that is permanently affixed to the retaining collar along one side while also housing a pivoting member along the opposite side.

8. The differential stabilizer arm for motor vehicle suspension of claim 7, wherein said connecting arm is slidably inserted into the retaining collar, and said retaining collar further comprises:
   an upper slide assist block affixed along the internal perimeter of the retaining collar and manufactured from a material so as to provide a means for reducing the friction generated between the contact of the connecting arm and the retaining collar;
   a lower slide assist block affixed along the internal perimeter of the retaining collar and manufactured from a material so as to provide a means for reducing the friction generated between the contact of the connecting arm and the retaining collar.

9. The differential stabilizer arm for motor vehicle suspension of claim 8, wherein said upper and lower slide assist blocks are manufactured from polyethylene.

* * * * *